United States Patent
Zheng et al.

(10) Patent No.: US 10,694,746 B2
(45) Date of Patent: Jun. 30, 2020

(54) FUNGICIDAL COMPOSITION

(71) Applicant: JIANGSU HUIFENG BIO AGRICULTURE CO., LTD., Yancheng, Jiangsu (CN)

(72) Inventors: Zuntao Zheng, Yancheng (CN); Hangen Zhong, Yancheng (CN); Hongjin Ji, Yancheng (CN)

(73) Assignee: JIANGSU HUIFENG BIO AGRICULTURE CO., LTD., Jiangsu (CN)

( * ) Notice: Subject to any disclaimer, the term of this patent is extended or adjusted under 35 U.S.C. 154(b) by 0 days.

(21) Appl. No.: 16/097,474

(22) PCT Filed: Aug. 8, 2016

(86) PCT No.: PCT/CN2016/094036
§ 371 (c)(1),
(2) Date: Oct. 29, 2018

(87) PCT Pub. No.: WO2017/185559
PCT Pub. Date: Nov. 2, 2017

(65) Prior Publication Data
US 2019/0150446 A1    May 23, 2019

(30) Foreign Application Priority Data
Apr. 29, 2016 (CN) .......................... 2016 1 0287269

(51) Int. Cl.
*A01N 43/80* (2006.01)
*A01N 47/14* (2006.01)
*A01N 25/04* (2006.01)
*A01N 25/12* (2006.01)
*A01N 25/14* (2006.01)

(52) U.S. Cl.
CPC ............ *A01N 43/80* (2013.01); *A01N 25/04* (2013.01); *A01N 25/12* (2013.01); *A01N 25/14* (2013.01); *A01N 47/14* (2013.01)

(58) Field of Classification Search
CPC combination set(s) only.
See application file for complete search history.

(56) References Cited

U.S. PATENT DOCUMENTS

| | | | |
|---|---|---|---|
| 6,436,968 B1 | 8/2002 | Erdelen et al. | |
| 6,436,976 B1 | 8/2002 | Erdelen et al. | |
| 6,680,325 B2 | 1/2004 | Erdelen et al. | |
| 6,803,377 B2 | 10/2004 | Erdelen et al. | |
| 7,179,814 B2 | 2/2007 | Erdelen et al. | |
| 7,232,840 B2 | 6/2007 | Erdelen et al. | |
| 7,361,673 B2 | 4/2008 | Erdelen et al. | |
| 7,696,237 B2 | 4/2010 | Erdelen et al. | |
| 7,763,266 B2 | 7/2010 | Erdelen et al. | |
| 7,910,569 B2 | 3/2011 | Huff et al. | |
| 8,153,665 B2 | 4/2012 | Erdelen et al. | |
| 8,617,581 B2 | 12/2013 | Erdelen et al. | |
| 2003/0083358 A1 | 5/2003 | Erdelen et al. | |
| 2003/0149080 A1 | 8/2003 | Erdelen et al. | |
| 2004/0116484 A1 | 6/2004 | Erdelen et al. | |
| 2005/0026962 A1 | 2/2005 | Erdelen et al. | |
| 2006/0084573 A1* | 4/2006 | Grech | C05B 7/00 504/101 |
| 2007/0043086 A1 | 2/2007 | Erdelen et al. | |
| 2007/0135391 A1 | 6/2007 | Huff et al. | |
| 2008/0108607 A1 | 5/2008 | Erdelen et al. | |
| 2009/0170912 A1 | 7/2009 | Erdelen et al. | |
| 2009/0186860 A1 | 7/2009 | Huff et al. | |
| 2010/0305170 A1 | 12/2010 | Erdelen et al. | |
| 2014/0107112 A1 | 4/2014 | Erdelen et al. | |
| 2019/0373892 A1* | 12/2019 | Valpey, III | A01N 25/34 |

FOREIGN PATENT DOCUMENTS

| | | |
|---|---|---|
| CN | 1566104 A | 1/2005 |
| CN | 1566113 A | 1/2005 |
| CN | 1878469 A | 12/2006 |
| CN | 101326915 A | 12/2008 |
| CN | 101984809 A | 3/2011 |
| CN | 101999372 A | 4/2011 |
| CN | 102172240 A | 9/2011 |
| CN | 104488534 A | 4/2015 |
| CN | 105685061 A | 6/2016 |
| CN | 106259387 A | 1/2017 |

OTHER PUBLICATIONS

Derwent abstract 2017-03900K; abstracting CN 106259387 (2017).*
Jan. 26, 2017 International Search Report issued in International Patent Application No. PCT/CN2016/094036.

* cited by examiner

*Primary Examiner* — John Pak
(74) *Attorney, Agent, or Firm* — Oliff PLC

(57) ABSTRACT

A fungicidal composition is provided. The effective ingredients of the composition comprise active components A and B, wherein the active component A is a compound having a structure of Formula (I), and the active component B is mancozeb; and the weight ratio of the two components is 1:1-400. Also provided are a preparation method and use of the composition. Test results show that the fungicidal composition has an obvious synergistic effect, and more importantly, the application rate is reduced and the cost is lowered. The fungicidal composition is effective in controlling certain specific fungal diseases of the crops. Through the combination of different fungicides with different mechanisms and modes of action, the application rate of each single agent is effectively reduced, and a good effect on broadening the fungicidal spectrum, retarding the development of fungal resistance and improving the control effect is exhibited.

Formula (I)

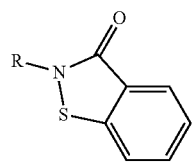

18 Claims, No Drawings

FUNGICIDAL COMPOSITION

BACKGROUND

Technical Field

The present invention relates to the field of protection of agricultural plants, in particular to a fungicidal composition with improved properties, and particularly to a fungicidal composition comprising a benzisothiazolinone and mancozeb.

Related Art

Benzisothiazolinone compounds are a new broad-spectrum fungicide, which is mainly used for controlling and treating various bacterial and fungal diseases on cereal crops, vegetables, and fruits. The mechanisms of fungicidal action mainly include destroying the nuclei structure of the harmful fungi to cause them to die due to lose of the core component, and interfering with the metabolism of the fungal cells to cause physiological disturbance, thus ultimately leading to death. When the agent is used in the early stage of disease development, the plants may be effectively protected against infection of pathogens; and when the agent is used in an appropriately increased amount after the disease is developed, the spread of the harmful fungi is considerably controlled, thus achieving dual actions of protection and eradication.

Mancozeb is a protective fungicide having high efficacy, low toxicity, low residue, and broad fungicidal spectrum, which is mainly used for controlling various fungal diseases on wheat, fruits, and vegetables. The mechanisms of fungicidal action is such that after application, a layer of breathable, water-permeable and light-transmissible dense protective film is formed on the surface of leaves and fruits to inhibit the germination and invasion of fungal spores and destroy the activity of various enzymes required for normal physiological metabolism of fungi, thereby achieving the purpose of sterilization and disease prevention.

Practical experience in pesticides has shown that repeated and specific application of an active compound to control harmful fungi leads in many cases to the rapid selectivity of fungal strains. To reduce the risk of selectivity of resistant fungal strains, a mixture of compounds with different activities is generally used at present to control harmful fungi. By combining active compounds with different mechanisms of action, it is possible to delay the development of resistance, reduce the application rate and reduce the cost.

SUMMARY

In view of the problems of resistance development and residue in the soil encountered by fungicides in practical application, an object of the present invention is to screen out fungicides with different mechanisms of bactericidal action, which are combined to obtain a new fungicidal composition, so as to enhance the control effect of the bactericides, delaying the resistance development, reduce the amount of application, and reduce the cost.

Another object of the present invention is to provide a method for preparing a fungicidal composition comprising active components A and B and use thereof in controlling the pests on crops in the agricultural area.

The objects of the present invention can be achieved through the following measures.

A fungicidal composition having synergistic effect comprises active components A and B, wherein the active component A is a compound having a structure of Formula (I), and the active component B is mancozeb.

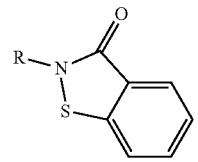

Formula (I)

In Formula (I), R is selected from H or $C_1$-$C_8$ alkyl.

In the present invention, $C_1$-$C_8$ alkyl refers to a linear or branched alkyl group having 1 to 8 carbon atoms, and includes $C_1$ alkyl (e.g. methyl), $C_2$ alkyl (e.g. ethyl), $C_3$ alkyl (e.g. n-propyl and i-propyl), $C_4$ alkyl (e.g. n-butyl, i-butyl, t-butyl, and s-butyl), $C_5$ alkyl (e.g. n-pentyl and the like), $C_6$ alkyl, $C_7$ alkyl, and $C_8$ alkyl, including, but not limited to, $C_1$-$C_6$ alkyl, $C_1$-$C_5$ alkyl, and $C_1$-$C_4$ alkyl.

In a preferred embodiment, R is selected from H or $C_1$-$C_4$ alkyl.

In a further preferred embodiment, R is selected from H, —$CH_3$, or —$C_4H_9$.

In Formula (I), when R is H, A is 1,2-benzisothiazolin-3-one (BIT).

In Formula (I), when R is $CH_3$, A is 2-methyl-1,2-benzisothiazolin-3-one (MBIT).

In Formula (I), when R is $C_4H_9$, A is 2-n-butyl-1,2-benzisothiazolin-3-one (BBIT), where in the formula, the butyl is n-butyl.

The inventor has found through experiments that the composition of the present invention has an obvious synergistic effect on controlling bacterial or fungal diseases of crops and more importantly, the application rate is reduced and the cost is lowered. The compounds constituting the components A and B have different structures and different mechanisms of action, and the combination of the two compounds can broaden the fungicidal spectrum and retard the occurrence and development of fungal resistance to a certain extent. Moreover, no cross resistance exists between the components A and B.

The weight ratio between the two components in the fungicidal composition of the present invention is 1:3-300. In a preferred embodiment, the weight ratio between the active component A and the active component B is 1:4-280. To make the synergistic effect between the two components more obvious, the weight ratio between the components A and B may be further preferably 1:10-270.

In a preferred embodiment, the weight ratio between the components A and B may be adjusted to any one of 1:3, 1:4, 1:5, 1:6, 1:7, 1:8, 1:9, 1:10, 1:20, 1:30, 1:40, 1:50, 1:60, 1:70, 1:80, 1:90, 1:100, 1:110, 1:120, 1:130, 1:140, 1:150, 1:160, 1:170, 1:180, 1:190, 1:200, 1:210, 1:220, 1:230, 1:250, 1:260, 1:270, 1:280, 1:290, and 1:300 at will, or be selected from a range delimited by any two ratios above.

The composition of the present invention may be prepared into a pesticidally acceptable formulation with the active ingredients and a pesticide aid or adjuvant.

In an embodiment, the content of the active components in the composition is 2-95%, and preferably 5-95% by weight.

In another embodiment, the composition is in the form of a pesticidally acceptable formulation comprising 10-90 wt % of the active components and 90-10 wt % of a pesticide adjuvant.

The present invention provides use of the bactericidal composition comprising components A and B in the control of crop diseases in the agricultural area, in particular in the control of fungal or bacterial diseases of certain crops.

The composition may specifically comprise a pesticide adjuvant, such as one or more of a carrier, a solvent, a dispersant, a wetting agent, a binder, a thickener, an adhesive, a surfactant, a fertilizer and the like. A commonly used adjuvant may be blended during application.

The suitable adjuvant or aid may be a solid or liquid that is generally a material commonly used in the preparation of formulations, for example, a natural or regenerated mineral substance, a solvent, a dispersing agent, a wetting agent, an adhesive, a thickener, or a binder.

The composition of the present invention may be applied by administering the composition of the present invention to the aboveground parts of plants, in particular to the leaves or leaf surface thereof. The composition may be used for seed impregnation, or applied onto the surface of the objects to be controlled. The application frequency and dosage depend on the pathogen biology and the climatic and maintenance conditions. The locus where the plant is growing, for example rice field, may be impregnated with a liquid formulation of the composition, or the composition is applied in solid form to the soil, for example, in granular form (soil application), where the composition penetrates the plant through the roots via the soil (systemic action).

The composition of the present invention can be prepared into various pesticidally acceptable formulations, including, but not limited to, emulsifiable concentrates, suspensions, wettable powders, water dispersible granules, powders, granules, aqueous solutions, aqueous emulsions, microemulsions, bait, mother liquor, mother powder, and so on. In a preferred embodiment, the formulation in the present invention is a wettable powder, a suspension, water dispersible granules, an aqueous emulsion or a microemulsion. Depending on the properties of the compositions, the objectives intended to be achieved by applying the compositions, and the environmental conditions, the compositions may be applied by spraying, atomizing, dusting, scattering, or pouring.

The composition of the present invention may be prepared into various formulations through known processes. The active ingredients may be uniformly mixed with an adjuvant such as a solvent or a solid carrier and a surfactant if needed, and ground to prepare a desired formulation.

The solvent may be selected from aromatic hydrocarbons containing preferably 8 to 12 carbon atoms, for example, a xylene mixture, substituted benzene, or a phthalate ester, for example, dibutyl or dioctyl phthalate; aliphatic hydrocarbons, for example, cyclohexane or paraffin; alcohols, glycols and ethers and esters thereof, for example, ethanol, ethylene glycol, and ethylene glycol monomethyl ether; ketones, for example, cyclohexanone; high-polarity solvents, for example, N-methyl-2-pyrrolidone, dimethyl sulfoxide, or dimethyl formamide; and vegetable oils, for example, soy bean oil.

The solid carrier includes for example natural mineral fillers generally used in powders and dispersible powders, for example, talc, kaolin, montmorillonite or activated bauxite. To manage the physical properties of the composition, highly dispersive silicic acid or highly dispersive absorbent polymer carrier may also be added, for example, granular adsorptive carrier or non-adsorptive carrier. The suitable granular adsorptive carrier is porous, for example, pumice, soapy clay or bentonite. The suitable non-adsorptive carrier includes for example calcite or sand. Moreover, a large amount of inorganic or organic material that is pre-prepared into granules and especially dolomite may be used as the carrier.

As desired by the chemical nature of the active ingredients in the composition according to the present invention, the suitable surfactant includes lignin sulfonic acid, naphthalenesulfonic acid, phenolsulfonic acid, alkaline earth metal or amine salts, alkylarylsulfonates, alkylsulfates, alkylsulfonates, fatty alcohol sulfates, fatty acids and ethylene glycol sulfated fatty alcohol ethers, condensation products of sulfonated naphthalene and naphthalene derivatives with formaldehyde, condensation products of naphthalene or naphthalenesulfonic acid with phenol and formaldehyde, polyoxyethylene octyl phenyl ethers, ethoxylated iso-octylphenol, octylphenol, nonylphenol, alkylaryl polyethylene glycol ethers, tributylphenyl polyethylene glycol ether, tristearylphenyl polyethylene glycol ether, alkylaryl polyether alcohols, ethoxylated castor oil, polyoxyethylene alkyl ethers, condensation products of ethylene oxide, ethoxylated polyoxypropylene, polyethylene glycol ether laurate acetal, sorbates, waste lignin sulfite liquor, and methyl cellulose.

When a liquid formulation is prepared, the active ingredient A may be first dissolved in a basic material to form a metal salt of benzisothiazoline. Suitable basic materials include alkali metal carbonates, alkali metal hydroxides (e.g. sodium and potassium hydroxide), alkali metal alkoxycarbonates, alkali metal alkoxides or magnesium methoxide.

The two active ingredients in the composition of the present invention have a synergistic effect, such that the activity of the composition is obviously higher than the respective activity or expected sum of the respective activity of single compounds alone. The synergistic effect is manifested as reduced application rate, broadened fungicidal spectrum, fast onset of action, long-lasting control effect, better control of harmful fungi on plants by only one or a few applications, and broadened possible application interval. These features are particularly needed in the fungal control practice of plants.

The fungicidal composition of the present invention is applicable to the control of crop diseases in the agricultural area, and the specific diseases to be treated include, but are not limited to, peach bacterial shot hole, tobacco wildfire, rice sheath blight, cucumber angular leaf spot, cucumber downy mildew, rice bacterial leaf streak, rice bacterial foot rot, bacterial wilt of corn, *Fusarium* wilt of watermelon, downy mildew of grape, tomato bacterial wilt, eggplant bacterial wilt, rice false smut, rice bacterial leaf streak, pepper anthracnose, litchi ulcerates, grape anthracnose, tobacco bacterial wilt, cucumber anthracnose, celery leaf blotch, lotus root blight, strawberry powdery mildew, lettuce downy mildew, celery gray mold, apricot bacterial shot hole, peach ulcerates, onion downy mildew, cotton bacterial angular leaf spot, cucumber bacterial leaf blight and the like.

The composition of the present invention exhibits the following additional features. 1. The composition of the present invention has an obvious synergistic effect. 2. Because the two individual agents in the composition of the present invention have highly different structures and completely different mechanisms of action, no cross resistance exists, such that the problem of resistance development occurred due to the use of single agents alone can be retarded. 3. The composition of the present invention is safe for the crops and has good efficacy. The test proves that the fungicidal composition of the present invention has stable chemical properties, significant synergistic effects and obvious synergistic and complementary effects on the objects controlled.

DETAILED DESCRIPTION

To make the objects, the technical solution, and advantages of the present invention clearer, the present invention is described in further detail with reference to examples. It should be understood that the specific examples described herein are merely provided for illustrating, instead of limiting the present invention. Any modifications and equivalent improvements and substitutions can be made thereto without departing from the spirit and principle of the present invention, which are all fall within the protection scope of the present invention.

The percentages given in all the formulations in the examples below are all weight percentages. The various formulations are processed from the composition of the present invention by a process known in the prior art which may be varied as desired.

I. PREPARATION EXAMPLES OF FORMULATIONS

(I) Processing and Examples of Water Dispersible Granules

The active components A and B, an adjuvant and a filler were mixed evenly according to the ratio of the formulation, comminuted by gas stream into a wettable powder, then added with an amount of water, mixed, extruded, granulated, dried, and sieved, to obtain a water dispersible granule product.

1. Preparation of Water Dispersible Granules of Active Component A (BIT) and Active Component B Example 1: 71% BIT•Mancozeb Water Dispersible Granules BIT 1%, mancozeb 70%, potassium dodecyl sulfonate 5%, ammonium sulfate 3%, potassium alkyl naphthalene sulfonate 4%, and light calcium carbonate q.s. to 100%.

Example 2: 50.5% BIT•Mancozeb Water Dispersible Granules

BIT 0.5%, mancozeb 50%, sodium methyl naphthalene sulfonate-formaldehyde condensate 5%, sodium dodecyl sulfate 3%, sodium ligninsulfonate 6%, and diatomite q.s. to 100%.

Example 3: 25.1% BIT•Mancozeb Water Dispersible Granules

BIT 0.1%, mancozeb 25%, sodium carboxymethyl starch 2%, sodium dodecyl sulfate 4%, Xantham gum 2%, sodium ligninsulfonate 6%, and attapulgite q.s. to 100%.

2. Preparation of Water Dispersible Granules of Active Component A (MBIT) and Active Component B Example 4: 71% MBIT•Mancozeb Water Dispersible Granules MBIT 1%, mancozeb 70%, with the remaining components being the same as those in Example 1.

Example 5: 50.5% MBIT•Mancozeb Water Dispersible Granules

MBIT 0.5%, mancozeb 50%, with the remaining components being the same as those in Example 2.

Example 6: 25.1% MBIT•Mancozeb Water Dispersible Granules

MBIT 0.1%, mancozeb 25%, with the remaining components being the same as those in Example 3.

3. Preparation of Water Dispersible Granules of Active Component A (BBIT) and Active Component B Example 7: 71% BBIT•Mancozeb Water Dispersible Granules BBIT 1%, mancozeb 70%, with the remaining components being the same as those in Example 1.

Example 8: 50.5% BBIT•Mancozeb Water Dispersible Granules

BBIT 0.5%, mancozeb 50%, with the remaining components being the same as those in Example 2.

Example 9: 25.1% BBIT•Mancozeb Water Dispersible Granules

BBIT 0.1%, mancozeb 25%, with the remaining components being the same as those in Example 3.

(I) Processing and Examples of Suspensions

The active ingredients A and B were uniformly mixed with a dispersing agent, a wetting agent, a thickener, water and other components in proportion, and ground and/or high-speed sheared to give a semi-finished product, which was analyzed, supplemented with water, mixed uniformly, and filtered, to obtain a finished product.

1. Preparation of Suspensions of Active Component A (BIT) and Active Component B Example 10: 4% BIT•Mancozeb Suspension BIT 1%, mancozeb 3%, Xanthan gum 3%, bentonite 4%, magnesium aluminum silicate 2%, ethylene glycol 2%, sodium ligninsulfonate 7%, and water q.s. to 100%.

Example 11: 15.1% BIT•Mancozeb Suspension

BIT 0.1%, mancozeb 15%, bentonite 4%, glycerol 3%, sodium methyl naphthalene sulfonate-formaldehyde condensate 5%, and water q.s. to 100%.

Example 12: 21% BIT•Mancozeb Suspension

BIT 1%, mancozeb 20%, white carbon black 3%, glycerol 6%, sodium benzoate 2%, fatty alcohol polyoxyethylene ether phosphate 7%, and water q.s. to 100%.

Example 13: 5% BIT•Mancozeb Suspension

BIT 1%, mancozeb 4%, white carbon black 4%, ethylene glycol 5%, sodium ligninsulfonate 7%, Xantham gum 2%, and water q.s. to 100%.

2. Preparation of Suspensions of Active Component A (MBIT) and Active Component B

Example 14: 4% MBIT•Mancozeb Suspension

MBIT 1%, mancozeb 3%, with the remaining components being the same as those in Example 10.

Example 15: 15.1% MBIT•Mancozeb Suspension

MBIT 0.1%, mancozeb 15%, with the remaining components being the same as those in Example 11.

Example 16: 21% MBIT•Mancozeb Suspension

MBIT 1%, mancozeb 20%, with the remaining components being the same as those in Example 12.

Example 17: 5% MBIT•Mancozeb Suspension

MBIT 1%, mancozeb 4%, with the remaining components being the same as those in Example 13.

3. Preparation of Suspensions of Active Component A (BBIT) and Active Component B

Example 18: 4% BBIT•Mancozeb Suspension

BBIT 1%, mancozeb 3%, with the remaining components being the same as those in Example 10.

Example 19: 15.1% BBIT•Mancozeb Suspension

BBIT 0.1%, mancozeb 15%, with the remaining components being the same as those in Example 11.

Example 20: 21% BBIT•Mancozeb Suspension

BBIT 1%, mancozeb 20%, with the remaining components being the same as those in Example 12.

Example 21: 5% BBIT•Mancozeb Suspension

BBIT 1%, mancozeb 4%, with the remaining components being the same as those in Example 13.

(III) Processing and Examples of Wettable Powder

The active ingredients A and B and various additives and fillers were fully mixed in proportion, and ground by an ultrafine grinder to prepare a wettable powder.

1. Preparation of Wettable Powders of Active Component A (BIT) and Active Component B

Example 22: 60.2% BIT•Mancozeb Wettable Powder (1:300)

BIT 0.2%, mancozeb 60%, sodium dodecyl benzene sulfonate 2%, calcium lignosulphonate 3%, bentonite 3%, and attapulgite q.s. to 100%.

Example 23: 40.2% BIT•Mancozeb Wettable Powder (1:200)

BIT 0.2%, mancozeb 40%, Nekal 2%, bentonite 1.5%, alkyl polyoxyethylene ether sulfonate 1%, white carbon black 2%, and diatomite q.s. to 100%.

Example 24: 51% BIT•Mancozeb Wettable Powder (1:50)

BIT 1%, mancozeb 50%, sodium ligninsulfonate 6%, alkyl sulfonate 7%, white carbon black 10%, and Kaolin q.s. to 100%.

2. Preparation of Wettable Powders of Active Component A (MBIT) and Active Component B

Example 25: 60.2% MBIT•Mancozeb Wettable Powder

MBIT 0.2%, mancozeb 60%, with the remaining components being the same as those in Example 22.

Example 26: 40.2% MBIT•Mancozeb Wettable Powder

MBIT 0.2%, mancozeb 40%, with the remaining components being the same as those in Example 23.

Example 27: 51% MBIT•Mancozeb Wettable Powder

MBIT 1%, mancozeb 50%, with the remaining components being the same as those in Example 24.

3. Preparation of Wettable Powders of Active Component A (BBIT) and Active Component B

Example 28: 60.2% BBIT•Mancozeb Wettable Powder

BBIT 0.2%, mancozeb 60%, with the remaining components being the same as those in Example 22.

Example 29: 40.2% BBIT•Mancozeb Wettable Powder

BBIT 0.2%, mancozeb 40%, with the remaining components being the same as those in Example 23.

Example 30: 51% BBIT•Mancozeb Wettable Powder

BBIT 1%, mancozeb 50%, with the remaining components being the same as those in Example 24.

II. EFFICIENCY VERIFICATION TEST

(I) Bioassay Examples

Based on the test grade scale, the disease development on the leaves of the whole cucumber plant was investigated, and the disease index and control effect were calculated. The control effect was converted into probability (y), the concentration of the agents (μg/ml) in solution was converted into a logarithmic value (x), the toxic regression equation and the median inhibition concentration EC50 were calculated by least square method, and the toxicity index and the co-toxicity coefficient (CTC) of the agents were calculated by SUN Peiyun method.

Actual toxicity index (ATI)=($EC50$ of standard/$EC50$ of test agent)*100

Theoretical toxicity index (TTI)=toxicity index of agent $A$*percentage content of $A$ in the mixture+toxicity index of agent $B$*percentage content of $B$ in the mixture Co-toxicity coefficient (CTC)=[actual toxicity index (ATI) of the mixture/theoretical toxicity index (TTI) of the mixture]*100

≥Where CTC≤80, the composition exhibits an antagonistic effect; where 80<CTC<120, the composition exhibits an additive effect, and where CTC≥120, the composition exhibits a synergistic effect.

1. Toxicity Test of BIT Combined with Mancozeb

TABLE 1

Toxicity test result analysis of BIT combined with mancozeb on cucumber downy mildew

| Name of agent | $EC_{50}$ (μg/ml) | ATI | TTI | Co-toxicity coefficient (CTC) |
|---|---|---|---|---|
| BIT | 13.5 | 100.00 | / | / |
| Mancozeb | 75.17 | 17.96 | / | / |
| BIT:mancozeb = 1:300 | 60.79 | 22.21 | 18.233 | 121.81 |
| BIT:mancozeb = 1:250 | 58.32 | 23.15 | 18.287 | 126.58 |
| BIT:mancozeb = 1:200 | 56.70 | 23.81 | 18.368 | 129.62 |
| BIT:mancozeb = 1:150 | 54.14 | 24.94 | 18.503 | 134.76 |
| BIT:mancozeb = 1:100 | 50.88 | 26.53 | 18.772 | 141.35 |
| BIT:mancozeb = 1:75 | 50.41 | 26.78 | 18.233 | 146.87 |
| BIT:mancozeb = 1:50 | 48.29 | 27.95 | 19.569 | 142.85 |
| BIT:mancozeb = 1:20 | 46.56 | 28.99 | 21.867 | 132.59 |
| BIT:mancozeb = 1:10 | 41.88 | 32.24 | 25.418 | 126.83 |
| BIT:mancozeb = 1:4 | 31.70 | 42.59 | 34.368 | 123.91 |
| BIT:mancozeb = 1:3 | 29.06 | 46.45 | 38.470 | 120.75 |
| BIT:mancozeb = 1:2 | 25.70 | 52.52 | 45.307 | 115.93 |

The results (in Table 1) show that the control effect of the combination of BIT and mancozeb on the cucumber downy mildew is significantly improved, suggesting that the combination of the two components has an obvious synergistic effect in the control of cucumber downy mildew.

2. Toxicity Test of MBIT Combined with Mancozeb

TABLE 2

Toxicity test result analysis of MBIT combined with mancozeb on potato late blight

| Name of agent | $EC_{50}$ (μg/ml) | ATI | TTI | Co-toxicity coefficient (CTC) |
|---|---|---|---|---|
| MBIT | 14.81 | 100.00 | / | / |
| Mancozeb | 68.27 | 21.69 | / | / |
| MBIT:mancozeb = 1:300 | 54.53 | 27.16 | 21.950 | 123.740 |
| MBIT:mancozeb = 1:250 | 51.61 | 28.69 | 22.002 | 130.414 |
| MBIT:mancozeb = 1:200 | 50.28 | 29.45 | 22.080 | 133.393 |
| MBIT:mancozeb = 1:150 | 48.17 | 30.74 | 22.209 | 138.431 |
| MBIT:mancozeb = 1:100 | 45.50 | 32.55 | 22.465 | 144.889 |
| MBIT:mancozeb = 1:75 | 45.50 | 32.55 | 21.950 | 148.298 |
| MBIT:mancozeb = 1:50 | 44.48 | 33.30 | 23.225 | 143.359 |

TABLE 2-continued

Toxicity test result analysis of MBIT combined with mancozeb on potato late blight

| Name of agent | $EC_{50}$ (μg/ml) | ATI | TTI | Co-toxicity coefficient (CTC) |
|---|---|---|---|---|
| MBIT:mancozeb = 1:20 | 42.75 | 34.65 | 25.419 | 136.304 |
| MBIT:mancozeb = 1:10 | 39.34 | 37.64 | 28.809 | 130.659 |
| MBIT:mancozeb = 1:4 | 31.27 | 47.36 | 37.352 | 126.798 |
| MBIT:mancozeb = 1:3 | 29.25 | 50.64 | 41.268 | 122.701 |
| MBIT:mancozeb = 1:2 | 26.04 | 56.86 | 47.793 | 118.977 |

The results (in Table 2) show that the control effect of the combination of MBIT and mancozeb on potato late blight is significantly improved, suggesting that the combination of the two components has an obvious synergistic effect in the control of potato late blight. Particularly when the ratio of MBIT to mancozeb is in the range of 1:3-300, the synergistic effect is obvious.

3. Toxicity Test of BBIT Combined with Mancozeb

TABLE 3

Toxicity test result analysis of BBIT combined with mancozeb on apple anthracnose

| Name of agent | $EC_{50}$ (μg/ml) | ATI | TTI | Co-toxicity coefficient (CTC) |
|---|---|---|---|---|
| BBIT | 19.09 | 100 | / | / |
| mancozeb | 92.36 | 20.67 | / | / |
| BBIT:mancozeb = 1:300 | 75.22 | 25.38 | 20.934 | 121.237 |
| BBIT:mancozeb = 1:250 | 72.22 | 26.43 | 20.986 | 125.959 |
| BBIT:mancozeb = 1:200 | 68.16 | 28.01 | 21.065 | 132.969 |
| BBIT:mancozeb = 1:150 | 65.71 | 29.05 | 21.195 | 137.058 |
| BBIT:mancozeb = 1:100 | 61.97 | 30.81 | 21.455 | 143.583 |
| BBIT:mancozeb = 1:75 | 62.44 | 30.57 | 20.934 | 146.048 |
| BBIT:mancozeb = 1:50 | 60.89 | 31.35 | 22.225 | 141.068 |
| BBIT:mancozeb = 1:20 | 58.31 | 32.74 | 24.448 | 133.910 |
| BBIT:mancozeb = 1:10 | 52.58 | 36.30 | 27.882 | 130.207 |
| BBIT:mancozeb = 1:4 | 41.36 | 46.15 | 36.536 | 126.316 |
| BBIT:mancozeb = 1:3 | 38.57 | 49.49 | 40.503 | 122.187 |
| BBIT:mancozeb = 1:2 | 34.22 | 55.79 | 47.113 | 118.415 |

The results (in Table 3) show that the control effect of the combination of BBIT and mancozeb on apple anthracnose is significantly improved, suggesting that the combination of the two components has an obvious synergistic effect in the control of apple anthracnose.

II. FIELD EFFICIENCY VERIFICATION TEST

Test method: in early stage of disease development, the first spray was given immediately, and then the second application was given after 7 days. Each treatment included 4 plots of 20 square meters each. The disease development before application and 11 days after the second application was statistically investigated. Samples were collected from 5 locations in each plot at random, and 5 plants were investigated at each location by investigating the percentages of the disease spot area on the leaves relative to the leaf area of the whole plant and grading. The disease index and the control effect were calculated.

Disease index =

$$\frac{\sum \left(\begin{array}{c}\text{Number of leaves at} \\ \text{each grade of disease} \times \\ \text{development}\end{array} \begin{array}{c}\text{Representative value} \\ \text{of corres-} \\ \text{ponding grade}\end{array}\right)}{\text{Total number of} \times \text{Representative} \\ \text{leaves investigated} \times \text{value of highest level}} \times 100$$

Control effect (%) =

$$\left(1 - \frac{\begin{array}{c}\text{Disease index of control} \\ \text{group before application}\end{array} \times \begin{array}{c}\text{Disease index of treatment} \\ \text{group after application}\end{array}}{\begin{array}{c}\text{Disease index of control} \\ \text{group after application}\end{array} \times \begin{array}{c}\text{Disease index of treatment} \\ \text{group before application}\end{array}}\right) \times 100$$

Anticipated control effect (%)=$X+Y-XY$/100

(where X and Y are the control effect of a single agent)

Grade Scale:

Grade 0: no disease spot;

Grade 1: number of disease spots on the leaf<5, and length<1 cm;

Grade 3: 6≤number of disease spots on the leaf≤10, and length of some disease spots>1 cm;

Grade 5: 11≤number of disease spots on the leaf≤25, some disease spots are contiguous, and the disease spot area is 10-25% of the leaf area;

Grade 7: number of disease spots on the leaf≥26, the disease spots are contiguous, and the disease spot area is 26-50% of the leaf area;

Grade 9: the disease spots are contiguous, and the disease spot area is above 50% of the leaf area, or all the leaves all wilted.

1. Field Efficacy Test of BIT Combined with Mancozeb

TABLE 4

Control effect of BIT combined with mancozeb on apple ring rot

| | | | | Day 11 after the second application | |
|---|---|---|---|---|---|
| No. | Agent | Amount (mg/kg) | Disease index before application | Disease index | Control effect (%) |
| Example 1 | 5% BIT water dispersible granules | 16.9 | 11.94 | 18.19 | 25.36 |
| | 75% mancozeb water dispersible granules | 1183.1 | 9.74 | 8.93 | 55.08 |
| | Anticipated control efficacy after mixing them | — | — | — | 66.47 |
| | 71% BIT • mancozeb water dispersible granules (BIT:mancozeb = 1:70) | 1200 | 10.53 | 5.37 | 75.04 |
| Example 2 | 3% BIT water dispersible granules | 11.9 | 10.24 | 15.93 | 23.78 |
| | 75% mancozeb water dispersible granules | 1188.1 | 11.76 | 10.27 | 57.23 |
| | Anticipated control efficacy after mixing them | — | — | — | 67.40 |
| | 50.5% BIT • mancozeb water dispersible granules (BIT:mancozeb = 1:100) | 1200 | 9.02 | 4.56 | 75.26 |
| Example 3 | 3% BIT water dispersible granules | 4.8 | 15.4 | 27.55 | 12.35 |
| | 75% mancozeb water dispersible granules | 1195.2 | 10.56 | 8.42 | 60.94 |
| | Anticipated control efficacy after mixing them | — | — | — | 65.76 |
| | 25.1% BIT • mancozeb suspension (BIT:mancozeb = 1:250) | 1200 | 13.03 | 7.65 | 71.23 |
| Example 10 | 5% BIT suspension | 300 | 12.04 | 9.61 | 60.89 |
| | 40% mancozeb suspension | 900 | 9.94 | 15.41 | 44.03 |
| | Anticipated control efficacy after mixing them | — | — | — | 78.11 |
| | 4% BIT • mancozeb suspension (BIT:mancozeb = 1:3) | 1200 | 10.56 | 5.15 | 84.12 |
| Example 11 | 5% BIT suspension | 8 | 15.23 | 24.42 | 21.45 |
| | 40% mancozeb suspension | 1192 | 10.47 | 8.87 | 58.51 |
| | Anticipated control efficacy after mixing them | — | — | — | 67.41 |
| | 15.1% BIT • mancozeb suspension (BIT:mancozeb = 1:150) | 1200 | 11.21 | 6.01 | 73.75 |
| Example 12 | 5% BIT suspension | 57.1 | 14.45 | 17.66 | 40.12 |
| | 40% mancozeb suspension | 1142.9 | 12.74 | 14.51 | 44.2 |
| | Anticipated control efficacy after mixing them | — | — | — | 66.59 |

TABLE 4-continued

Control effect of BIT combined with mancozeb on apple ring rot

| | | | | Day 11 after the second application | |
|---|---|---|---|---|---|
| No. | Agent | Amount (mg/kg) | Disease index before application | Disease index | Control effect (%) |
| | 21% BIT • mancozeb suspension (BIT:mancozeb = 1:20) | 1200 | 15.23 | 8.84 | 71.56 |
| Example 13 | 5% BIT suspension | 240 | 10.45 | 11.04 | 48.23 |
| | 40% mancozeb suspension | 960 | 10.57 | 11.36 | 47.35 |
| | Anticipated control efficacy after mixing them | — | — | — | 72.74 |
| | 5% BIT • mancozeb suspension (BIT:mancozeb = 1:4) | 1200 | 9.04 | 4.09 | 77.86 |
| Example 22 | 3% BIT wettable powder | 4 | 12.45 | 22.81 | 10.24 |
| | 80% mancozeb wettable powder | 1196 | 10 | 7.86 | 61.51 |
| | Anticipated control efficacy after mixing them | — | — | — | 65.45 |
| | 60.2% BIT • mancozeb wettable powder (BIT:mancozeb = 1:300) | 1200 | 10.54 | 6.45 | 70.02 |
| Example 23 | 3% BIT wettable powder | 6 | 15.23 | 25.42 | 18.25 |
| | 80% mancozeb wettable powder | 1194 | 15.45 | 12.58 | 60.12 |
| | Anticipated control efficacy after mixing them | — | — | — | 67.40 |
| | 40.2% BIT • mancozeb wettable powder (BIT:mancozeb = 1:200) | 1200 | 16.34 | 8.90 | 73.33 |
| Example 24 | 3% BIT wettable powder | 23.5 | 14.96 | 21.31 | 30.23 |
| | 80% mancozeb wettable powder | 1176.5 | 15.02 | 15.25 | 50.25 |
| | Anticipated control efficacy after mixing them | — | — | — | 65.29 |
| | 51% BIT • mancozeb wettable powder (BIT:mancozeb = 1:50) | 1200 | 14.22 | 8.18 | 71.82 |
| CK | Water control | — | 12.34 | 25.19 | — |

The test results (in Table 4) show that the control effect of the combination of BIT and mancozeb on apple ring rot is significantly improved, suggesting that the combination of the two components has an obvious synergistic effect in the control of ring rot.

2. Field Efficacy Test of MBIT Combined with Mancozeb

TABLE 5

Control effect of MBIT combined with mancozeb on tomato early blight

| | | | | Day 11 after the second application | |
|---|---|---|---|---|---|
| No. | Agent | Amount (a.i.g/ha) | Disease index before application | Disease index | Control effect (%) |
| Example 4 | 5% MBIT water dispersible granules | 28.0 | 13.45 | 17.93 | 29.2 |
| | 75% mancozeb water dispersible granules | 1972.0 | 12.51 | 11.03 | 53.16 |
| | Anticipated control efficacy after mixing them | — | — | — | 66.84 |
| | 71% BIT • mancozeb water dispersible granules (MBIT:mancozeb = 1:70) | 2000.0 | 15.67 | | 71.42 |
| Example 5 | 3% MBIT water dispersible granules | 19.8 | 17.35 | 24.76 | 24.21 |
| | 75% mancozeb water dispersible granules | 1980.2 | 16.34 | 13.77 | 55.23 |

TABLE 5-continued

Control effect of MBIT combined with mancozeb on tomato early blight

| No. | Agent | Amount (a.i.g/ha) | Disease index before application | Day 11 after the second application | |
|---|---|---|---|---|---|
| | | | | Disease index | Control effect (%) |
| | Anticipated control efficacy after mixing them | — | — | — | 66.07 |
| | 50.5% MBIT • mancozeb water dispersible granules (MBIT:mancozeb = 1:100) | 2000 | 14.23 | 6.51 | 75.69 |
| Example 6 | 3% MBIT water dispersible granules | 8.0 | 14.36 | 23.89 | 11.63 |
| | 75% mancozeb water dispersible granules | 1992.0 | 16.77 | 12.59 | 60.12 |
| | Anticipated control efficacy after mixing them | — | — | — | 64.76 |
| | 25.1% MBIT • mancozeb suspension (MBIT:mancozeb = 1:250) | 2000 | 15.28 | 8.04 | 72.07 |
| Example 14 | 5% MBIT suspension | 500 | 17.25 | 10.36 | 68.09 |
| | 40% mancozeb suspension | 1500 | 16.33 | 21.15 | 31.21 |
| | Anticipated control efficacy after mixing them | — | — | — | 78.05 |
| | 4% MBIT • mancozeb suspension (MBIT:mancozeb = 1:3) | 2000 | 18.23 | 6.49 | 81.08 |
| Example 15 | 5% MBIT suspension | 13.2 | 15.34 | 23.01 | 20.33 |
| | 40% mancozeb suspension | 1986.8 | 14.79 | 11.64 | 58.21 |
| | Anticipated control efficacy after mixing them | — | — | — | 66.71 |
| | 15.1% MBIT • mancozeb suspension (MBIT:mancozeb = 1:150) | 2000 | 15.97 | 7.44 | 75.25 |
| Example 16 | 5% MBIT suspension | 95.2 | 18.34 | 19.21 | 44.35 |
| | 40% mancozeb suspension | 1904.8 | 10.99 | 10.72 | 48.2 |
| | Anticipated control efficacy after mixing them | — | — | — | 71.17 |
| | 21% MBIT • mancozeb suspension (MBIT:mancozeb = 1:20) | 2000 | 14.34 | 6.64 | 75.39 |
| Example 17 | 5% MBIT suspension | 400.0 | 16.34 | 11.31 | 63.23 |
| | 40% mancozeb suspension | 1600.0 | 15.27 | 18.65 | 35.11 |
| | Anticipated control efficacy after mixing them | — | — | — | 76.14 |
| | 5% MBIT • mancozeb suspension (MBIT:mancozeb = 1:4) | 2000 | 17.45 | 5.28 | 83.92 |
| Example 25 | 3% MBIT wettable powder | 6.6 | 17.35 | 29.62 | 9.31 |
| | 80% mancozeb wettable powder | 1993.4 | 15.94 | 11.71 | 60.98 |
| | Anticipated control efficacy after mixing them | — | — | — | 64.61 |
| | 60.2% MBIT • mancozeb wettable powder (MBIT:mancozeb = 1:300) | 2000 | 17.34 | 9.52 | 70.84 |
| Example 26 | 3% MBIT wettable powder | 10.0 | 15.88 | 26.17 | 12.46 |
| | 80% mancozeb wettable powder | 1990.0 | 16.09 | 12.20 | 59.74 |
| | Anticipated control efficacy after mixing them | — | — | — | 64.76 |
| | 40.2% MBIT • mancozeb wettable powder (MBIT:mancozeb = 1:200) | 2000 | 13.45 | 6.90 | 72.75 |
| Example 27 | 3% MBIT wettable powder | 39.2 | 14.78 | 15.48 | 44.35 |
| | 80% mancozeb wettable powder | 1960.8 | 18.26 | 20.21 | 41.20 |
| | Anticipated control efficacy after mixing them | — | — | — | 67.28 |
| | 51% MBIT • mancozeb wettable powder (MBIT:mancozeb = 1:50) | 2000 | 15.98 | 7.71 | 74.39 |
| CK | Water control | — | 15.42 | 29.03 | — |

The test results (in Table 5) show that the control effect of the combination of MBIT and mancozeb on tomato early blight is significantly improved, suggesting that the combination of the two components has an obvious synergistic effect in the control of tomato early blight.

3. Field Efficacy Test of BBIT Combined with Mancozeb

TABLE 6

Control effect of MBIT combined with mancozeb on pear black spot

| No. | Agent | Amount (a.i.g/ha) | Disease index before application | Day 11 after the second application Disease index | Day 11 after the second application Control effect (%) |
|---|---|---|---|---|---|
| Example 7 | 5% BBIT water dispersible granules | 21 | 10.35 | 14.86 | 28.23 |
| | 75% mancozeb water dispersible granules | 1479 | 9.04 | 8.27 | 54.24 |
| | Anticipated control efficacy after mixing them | — | — | — | 67.16 |
| | 71% BBIT • mancozeb water dispersible granules (BBIT:mancozeb = 1:70) | 1500 | 10.98 | 6.36 | 71.02 |
| Example 8 | 3% BBIT water dispersible granules | 14.9 | 13.2 | 19.74 | 25.22 |
| | 75% mancozeb water dispersible granules | 1485.1 | 10.4 | 9.06 | 56.44 |
| | Anticipated control efficacy after mixing them | — | — | — | 67.43 |
| | 50.5% BBIT • mancozeb water dispersible granules (BBIT:mancozeb = 1:100) | 1500 | 9.99 | 4.55 | 77.21 |
| Example 9 | 3% BBIT water dispersible granules | 6.0 | 11.11 | 19.53 | 12.11 |
| | 75% mancozeb water dispersible granules | 1494.0 | 10.89 | 8.94 | 58.94 |
| | Anticipated control efficacy after mixing them | — | — | — | 63.91 |
| | 25.1% BBIT • mancozeb suspension (BBIT:mancozeb = 1:250) | 1500 | 12.39 | 6.97 | 71.88 |
| Example 18 | 5% BBIT suspension | 375 | 15.23 | 11.44 | 62.45 |
| | 40% mancozeb suspension | 1125 | 10.93 | 14.52 | 33.59 |
| | Anticipated control efficacy after mixing them | — | — | — | 75.06 |
| | 4% BBIT • mancozeb suspension (BBIT:mancozeb = 1:3) | 1500 | 12.32 | 4.35 | 82.34 |
| Example 19 | 5% BBIT suspension | 9.9 | 10.66 | 17.10 | 19.78 |
| | 40% mancozeb suspension | 1490.1 | 10.99 | 9.45 | 57.01 |
| | Anticipated control efficacy after mixing them | — | — | — | 65.51 |
| | 15.1% BBIT • mancozeb suspension (BBIT:mancozeb = 1:150) | 1500 | 15.24 | 7.66 | 74.85 |
| Example 20 | 5% BBIT suspension | 71.4 | 15.23 | 16.71 | 45.14 |
| | 40% mancozeb suspension | 1428.6 | 9.78 | 11.60 | 40.67 |
| | Anticipated control efficacy after mixing them | — | — | — | 67.45 |
| | 21% BBIT • mancozeb suspension (BBIT:mancozeb = 1:20) | 1500 | 12.45 | 6.48 | 73.99 |
| Example 21 | 5% BBIT suspension | 300 | 9.68 | 9.45 | 51.21 |
| | 40% mancozeb suspension | 1200 | 10.64 | 13.39 | 37.08 |
| | Anticipated control efficacy after mixing them | — | — | — | 69.30 |
| | 5% BBIT • mancozeb suspension (BBIT:mancozeb = 1:4) | 1500 | 11.23 | 5.35 | 76.18 |
| Example 28 | 3% BBIT wettable powder | 5.0 | 13.8 | 24.92 | 9.72 |
| | 80% mancozeb wettable powder | 1495.0 | 15.23 | 12.26 | 59.76 |
| | Anticipated control efficacy after mixing them | — | — | — | 63.67 |
| | 60.2% BBIT • mancozeb wettable powder (BBIT:mancozeb = 1:300) | 1500 | 9.78 | 5.63 | 71.20 |

TABLE 6-continued

Control effect of MBIT combined with mancozeb on pear black spot

| No. | Agent | Amount (a.i.g/ha) | Disease index before application | Disease index (Day 11 after the second application) | Control effect (%) |
|---|---|---|---|---|---|
| Example 29 | 3% BBIT wettable powder | 7.5 | 10.38 | 17.79 | 14.32 |
| | 80% mancozeb wettable powder | 1492.5 | 11.45 | 9.72 | 57.57 |
| | Anticipated control efficacy after mixing them | — | — | — | 63.65 |
| | 40.2% BBIT • mancozeb wettable powder (BBIT:mancozeb = 1:200) | 1500 | 9.78 | 5.44 | 72.21 |
| Example 30 | 3% BBIT wettable powder | 29.4 | 12.33 | 14.66 | 40.56 |
| | 80% mancozeb wettable powder | 1470.6 | 10.44 | 11.44 | 45.21 |
| | Anticipated control efficacy after mixing them | — | — | — | 67.43 |
| | 51% BBIT • mancozeb wettable powder (BBIT:mancozeb = 1:50) | 1500 | 15.01 | 7.08 | 76.42 |
| CK | Water control | — | 11.21 | 22.42 | — |

The test results (in Table 5) show that the control effect of the combination of BBIT and mancozeb on pear black spot is significantly improved, suggesting that the combination of the two components has an obvious synergistic effect in the control of pear black spot.

What is claimed is:

1. A fungicidal composition, consisting of active components A and B, wherein
    the active component A is 1,2-benzisothiazolin-3-one, 2-methyl-1,2-benzisothiazolin-3-one or 2-n-butyl-1,2-benzisothiazolin-3-one, and the active component B is mancozeb; and
    the weight ratio reported in terms of
        the active component A:the active component B is in a range of from 1:3 to 1:300.

2. The fungicidal composition according to claim 1, wherein the weight ratio is in a range of from 1:4 to 1:280.

3. The fungicidal composition according to claim 2, wherein the weight ratio is in a range of from 1:10 to 1:260.

4. A method comprising controlling crop diseases in an agricultural area by applying the fungicidal composition according to claim 1.

5. A method comprising controlling crop diseases in an agricultural area by applying the fungicidal composition according to claim 2.

6. A method comprising controlling crop diseases in an agricultural area by applying the fungicidal composition according to claim 3.

7. A fungicidal composition, consisting of active components A and B in a pesticidally acceptable formulation prepared with the active ingredients and a pesticide adjuvant or aid, wherein
    the active component A consists of 1,2-benzisothiazolin-3-one, 2-methyl-1,2-benzisothiazolin-3-one or 2-n-butyl-1,2-benzisothiazolin-3-one, and the active component B consists of mancozeb; and
    the weight ratio of the active components A and B reported in terms of
        the active component A:the active component B is in a range of from 1:3 to 1:300.

8. The fungicidal composition according to claim 7, wherein the mass content of the active ingredients is 2-95%.

9. The fungicidal composition according to claim 7, wherein the formulation is a wettable powder, a suspension, or water dispersible granules.

10. The fungicidal composition according to claim 7, wherein the pesticide adjuvant or aid is one or more member selected from the group consisting of a carrier, a solvent, a dispersant, a wetting agent, a binder, a thickener, an adhesive, a surfactant, and a fertilizer.

11. The fungicidal composition according claim 7, wherein the weight ratio is in a range of from 1:4 to 1:280.

12. The fungicidal composition according to claim 7, wherein the weight ratio is in a range of from 1:10 to 1:260.

13. The fungicidal composition according to claim 11, wherein the mass content of the active ingredients is 2-95%.

14. The fungicidal composition according to claim 11, wherein the formulation is a wettable powder, a suspension, or water dispersible granules.

15. The fungicidal composition according to claim 11, wherein the pesticide adjuvant or aid is one or more member selected from the group consisting of a carrier, a solvent, a dispersant, a wetting agent, a binder, a thickener, an adhesive, a surfactant, and a fertilizer.

16. The fungicidal composition according to claim 12, wherein the mass content of the active ingredients is 2-95%.

17. The fungicidal composition according to claim 12, wherein the formulation is a wettable powder, a suspension, or water dispersible granules.

18. The fungicidal composition according to claim 12, wherein the pesticide adjuvant or aid is one or more member selected from the group consisting of a carrier, a solvent, a dispersant, a wetting agent, a binder, a thickener, an adhesive, a surfactant, and a fertilizer.

* * * * *